(12) United States Patent
Watanabe et al.

(10) Patent No.: US 6,577,577 B2
(45) Date of Patent: Jun. 10, 2003

(54) DOWNSIZED DISK UNIT WITH REDUCED NOISE

(75) Inventors: Takashi Watanabe, Ichikawa (JP); Nobuhiko Fujimura, Hachioji (JP)

(73) Assignee: Teac Corporation, Tokyo (JP)

( * ) Notice: Subject to any disclaimer, the term of this patent is extended or adjusted under 35 U.S.C. 154(b) by 117 days.

(21) Appl. No.: 09/816,636

(22) Filed: Mar. 23, 2001

(65) Prior Publication Data

US 2001/0026520 A1 Oct. 4, 2001

(30) Foreign Application Priority Data

Mar. 30, 2000 (JP) .................................... 2000-095366
Mar. 16, 2001 (JP) .................................... 2001-076453

(51) Int. Cl.⁷ .............................................. G11B 33/02
(52) U.S. Cl. .................................................. 369/75.2
(58) Field of Search .............................. 369/75.1–75.2, 369/77.1–77.2

(56) References Cited

U.S. PATENT DOCUMENTS 6,317,402 B1 * 11/2001 Huang et al. ............. 369/77.1
6,320,835 B1 * 11/2001 Kamei ....................... 369/75.1
6,341,115 B1 * 1/2002 Otani et al. ................ 369/77.1
6,392,976 B1 * 5/2002 Lin ............................ 369/77.1
6,400,669 B1 * 6/2002 Lee ............................ 369/77.1

FOREIGN PATENT DOCUMENTS

JP          09274754 A      10/1997
JP          11259947 A       9/1999

* cited by examiner

*Primary Examiner*—Allen Cao
(74) *Attorney, Agent, or Firm*—Anderson Kill & Olick; Eugene Lieberstein; Michael N. Meller

(57) ABSTRACT

A disk unit includes a tray having one side portion thereof cut off so that a disk placed on the tray has a portion protruding therefrom, a housing which the tray is inserted into or ejected from, and an air current control member having a curved surface. The housing includes a first portion for housing the tray and a second portion for covering the protruding portion of the disk. The air current control member is provided in the second portion of the housing so as to have the curved surface opposing a peripheral edge of the disk moved into the housing.

12 Claims, 8 Drawing Sheets

DOWNSIZED DISK UNIT WITH REDUCED NOISE

BACKGROUND OF THE INVENTION

1. Field of the Invention

The present invention generally relates to disk units, and more particularly to a downsized disk unit.

2. Description of the Related Art

A 12 or 18 cm compact disk from which recorded data is reproduced by means of a laser pickup has been employed, for instance, as a storage medium for storing information such as a database or software. Therefore, a disk unit housed in a chassis or housing (a built-in-type CD-ROM drive) has been developed so as to be incorporated into a notebook computer.

A conventional disk unit has its disk tray driven by a motor. When the disk tray moves outside a chassis, a disk is placed on a turntable in the disk tray. Then, the disk tray is moved back again in the chassis by the driving force of the motor.

However, such a tray-driving method employing a motor as the one described above requires a disk unit to include a motor for driving a tray and a transmission mechanism for transmitting a driving force to the tray. This makes it difficult to produce a smaller and thinner disk unit, thus preventing the disk unit from being incorporated into the housing of a notebook computer.

Further, according to the above-described conventional disk unit, a whole disk is positioned in a disk placement portion formed in the disk tray. The disk placement portion is a circular concave portion with a bottom. Therefore, the disk tray is designed to have a width wider than the diameter of the disk. As a result, the conventional disk unit has a wide disk tray and the whole disk unit becomes large in size. Thus, it is difficult to downsize the conventional disk unit.

Therefore, there has been developed a disk unit that dispenses with the above-described motor and transmission mechanism and moves a disk tray, by a manual operation, to a housing position inside a chassis or to an ejection position outside the chassis.

As such a disk unit, the inventors have proposed a disk unit disclosed in Japanese Laid-Open Patent Application No. 11-259947. The disk unit includes a disk tray whose one side portion is cut off so that a disk has a portion protruding therefrom, and a chassis movably holding the disk tray.

Specifically, the chassis holds the disk tray so that the disk tray is movable between an ejection position in which the disk is placed on or removed from the disk tray and a housing position in which the disk tray is housed in the chassis. Further, the chassis includes a housing portion for housing the disk tray when the disk tray is in the housing position. In addition, the chassis includes a cover portion for housing the portion of the disk protruding from the disk tray when the disk tray is in the housing position. This structure allows the width of the disk tray to be decreased and accordingly, allows a space required for a disk tray movement to be reduced. Thereby, the disk unit can be downsized.

As previously described, a disk unit can be downsized by employing a disk tray from which a portion of a disk protrudes when the disk is loaded into the disk unit. However, there is a problem that a noise is generated in the disk unit having the above-described structure when the disk is rotated at a high speed.

This noise is generated by the rotations of the disk in a position where the protruding portion of the disk opposes the cover portion. This is because the surface of the cover portion does not smoothly oppose, or is not curved along, the peripheral edge of the disk so that an air current suddenly changes in the position when the disk is rotated at a high speed.

As previously described, the disk unit is used in a notebook computer or the like, which is used in an office or at home. Therefore, noiselessness becomes an important element.

SUMMARY OF THE INVENTION

It is a general object of the present invention to provide a disk unit in which the above-described disadvantage is eliminated.

A more specific object of the present invention is to provide a disk unit with improved noiselessness.

The above objects of the present invention are achieved by a disk unit including a tray having one side portion thereof cut off so that a disk placed on the tray has a portion protruding therefrom; a housing which the tray is inserted into or ejected from, the housing including a first portion for housing the tray and a second portion for covering the protruding portion of the disk; and an air current control member having a curved surface, wherein the air current control member is provided in the second portion of the housing so as to have the curved surface opposing a peripheral edge of the disk moved into the housing.

The above objects of the present invention are also achieved by a disk unit including a tray having one side portion thereof cut off so that a disk placed on the tray has a portion protruding therefrom; a housing which the tray is inserted into or ejected from, the housing including a first portion for housing the tray and a second portion for covering the protruding portion of the disk; and an air current control member provided in the second portion of the housing for controlling a flow of air currents generated by rotations of the disk so as to prevent the flow of the air currents from changing greatly.

According to the above-described disk units, a noise generation is prevented by providing the air current control member in the second portion since this structure prevents the flow of air currents generated by the rotations of the disk from changing greatly.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of an embodiment of the present invention.

Figure 1:
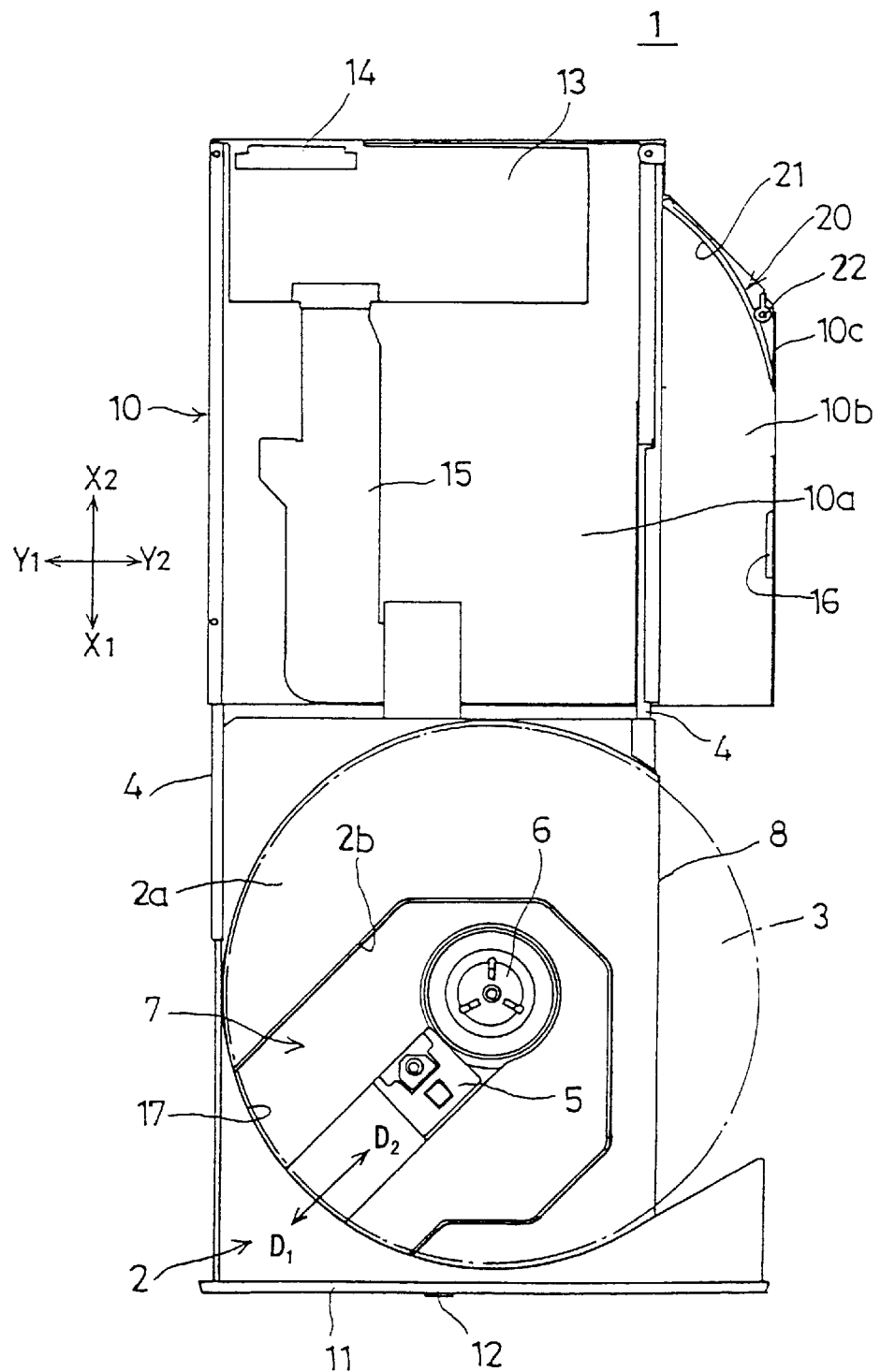
FIG. 1 is a top plan view of a disk unit according to an embodiment of the present invention in a state where a tray is ejected from the disk unit.
Figure 2:
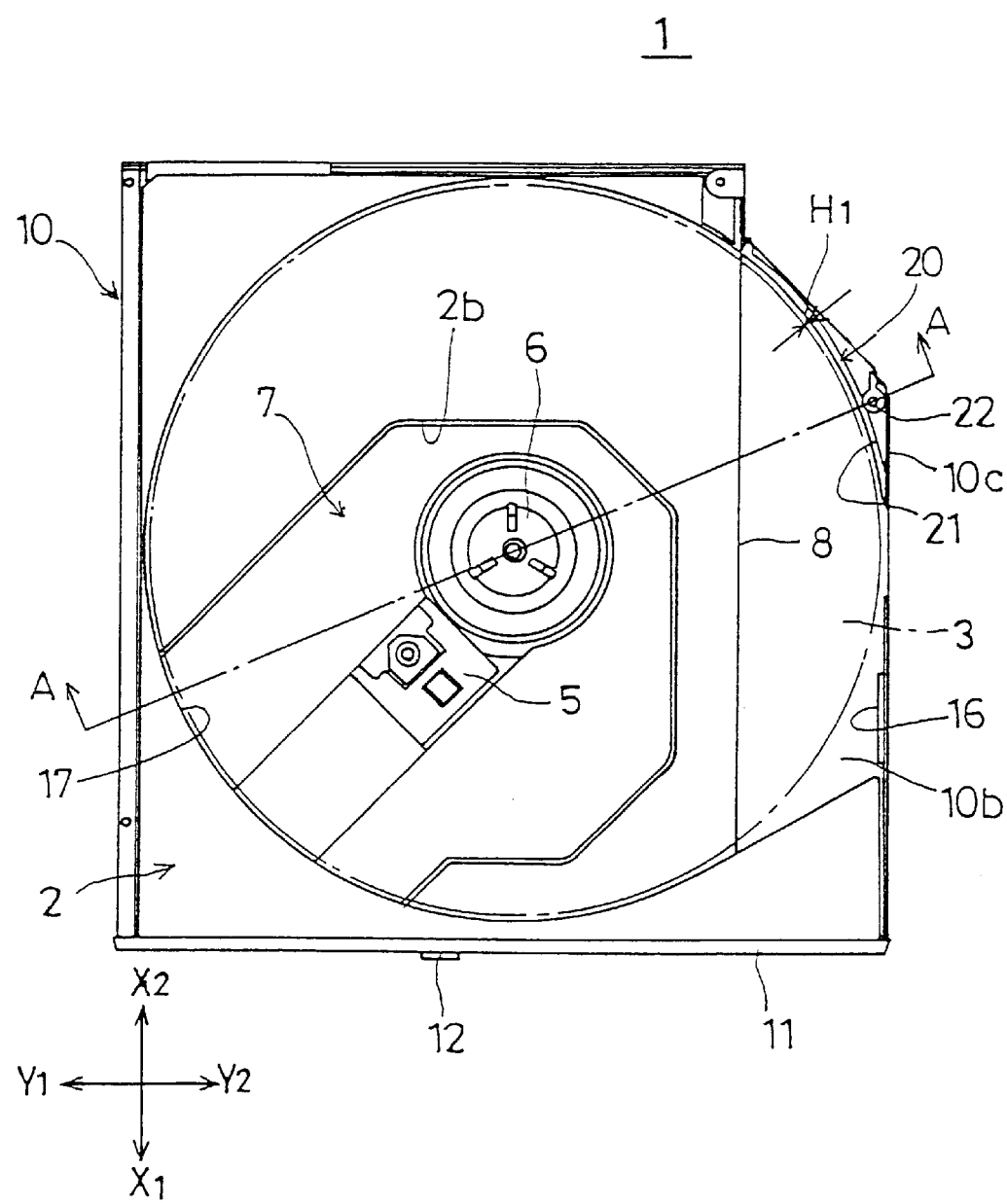
FIG. 2 is a top plan view of the disk unit in a state where the tray is housed in the disk unit.
Figure 3:
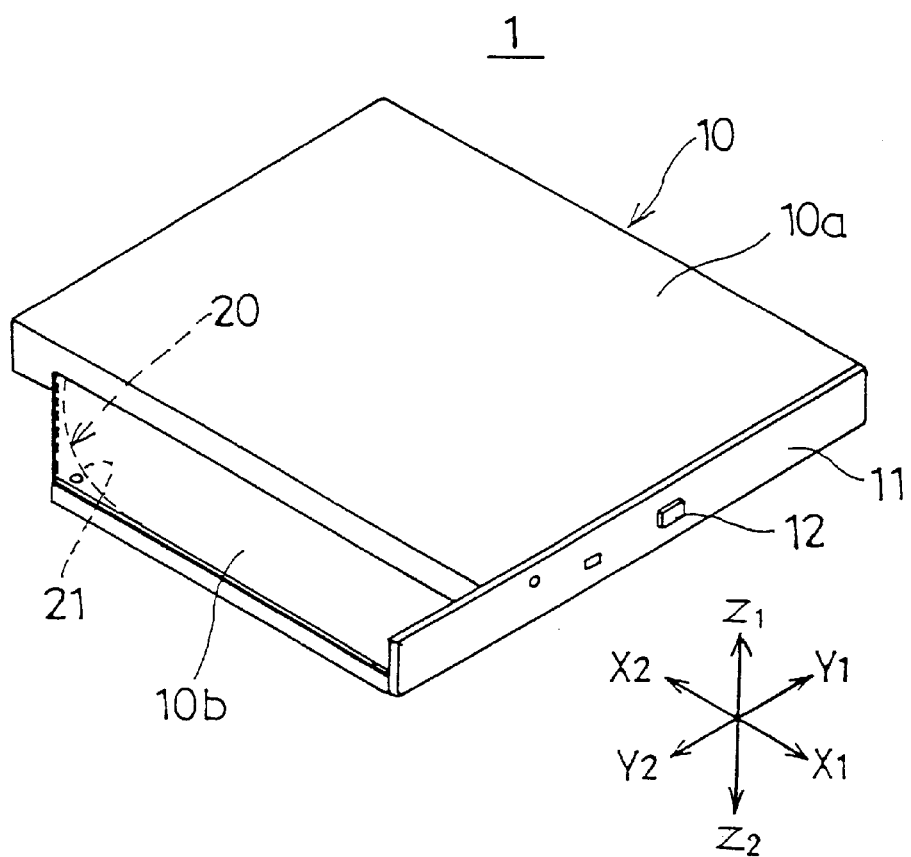
FIG. 3 is a perspective bottom view of the disk unit.

FIGS. 1 through 3 each show a disk unit 1 according to the embodiment of the present invention. The disk unit 1 is an electronic device to be housed in, for instance, the housing of a notebook computer (not shown).

As shown in each of the drawings, the disk unit 1 includes a tray 2, guide rail mechanisms 4, a turntable 6, a pickup assembly 7, and a chassis (housing) 10.

In each of FIGS. 1 through 3, a roof plate 9 (shown in FIG. 4) provided to cover the upper portion of the chassis 10 is removed. In FIG. 1, the tray 2 is in an election position in which the tray 2 is ejected from the chassis 10. In FIG. 2, the tray 2 is in a housing position in which the tray 2 is inserted into the chassis 10. FIG. 3 is a perspective bottom view of the disk unit 1.

The turntable 6, the pickup assembly 7, and a disk placement portion 17 are provided on the tray 2. The tray 2 is movable in X1 and X2 directions indicated by arrow X1–X2 in FIGS. 1 and 2 with respect to the chassis 10.

That is, the guide rail mechanisms 4 provided on the respective side portions of the chassis 10 extends in the X1 direction or retracts in the X2 direction so that the tray 2 moves in the X1 and X2 directions with respect to the chassis 10. Thus, by employing the guide rail mechanisms 4, the tray 2 can be ejected to a great extent in the X1 direction with respect to the chassis 10 as shown in FIG. 1. Therefore, a disk 3 can be easily placed on or removed from the tray 2.

The turntable 6 is provided substantially in the center position of the tray 2. The turntable 6, on which the disk 3 is placed, is rotated by a spindle motor (not shown) provided under the tray 2. Thereby, the disk 3 placed on the turntable 6 is also rotated. In this embodiment, the disk unit 1 has a disk rotation speed of 32×, so that the disk 3 is rotated at a high speed at a time of reproduction.

The tray 2 has the disk placement portion 17, which is a circular concave portion with a bottom and has a diameter slightly larger than that of the disk 3. The disk 3 is positioned in the disk placement portion when placed on the turntable 6.

The pickup assembly 7, which moves an optical pickup 5 in a radial direction of the disk 3 (a direction indicated by arrow D1–D2 in FIG. 1), is provided in the tray 2. The optical pickup 5 emits a laser beam onto the disk 3 and receives a light reflected therefrom to perform reproduction or recording. A detailed description of the pickup assembly 7 will be given later for the convenience of a description.

The tray 2 having the above-described structure is formed to have a width smaller than the outside diameter of the disk 3 so that the disk 3 has a portion protruding from the tray 2. In this embodiment, the tray 2 is moved between the ejection position and the housing position by a manual operation without using a drive means such as a motor in moving in the X1 or X2 direction.

Hence, the disk unit 1 can dispense with a drive mechanism including a motor and a transmission mechanism for moving the tray 2, thus reducing the number of components. Therefore, the disk unit 1 can be made smaller and thinner. Further, since the disk 3 has the portion protruding from the tray 2, the disk 3 can be easily placed on or removed from the tray 2 by holding this protruding portion.

A front bezel 11 is provided on the front surface portion of the tray 2 so as to move in the X1 and X2 directions integrally with the tray 2. A switch button 12 is provided in the center of the front bezel 11.

The tray 2 is locked by a lock mechanism (not shown) in the housing position so as to prevent the disk 3 from being removed unintentionally at the time of reproduction. The switch button 12 is provided in the center of the front bezel 11 to release the lock on the tray 2. When the switch button 12 is switched ON, the tray 2 becomes ejectable from the chassis 10.

Next, a description will be given of the chassis 10. The chassis 10 includes a box-like housing portion 10a for housing the tray 2, and a cover portion 10b for protecting the portion of the disk 3 protruding from the tray 2 when the tray 2 is in a housed state.

The housing portion 10a includes a printed circuit board 13 on which an electronic circuit is formed. The printed circuit board 13 and electronic components provided on the tray 2 are electrically connected by a flexible printed circuit 15. By employing the flexible printed circuit 15, an electrical connection between the tray 2 and the printed circuit board 13 can be established even when the tray 2 is movable with respect to the chassis 10.

The cover portion 10b is provided so as to cover the lower part of the above-described portion of the disk 3 protruding from the tray 2. Thereby, the protruding portion of the disk 3, which is not held by the tray 2, is protected by the cover portion 10b. The upper part of the protruding portion of the disk 3 is protected by the roof plate 9.

A sidewall 10c of the cover portion 10b includes first and second parts separate from each other, the first part being positioned closer to the front surface portion of the tray 2A than the second part. A brake member 16 is provided on the first part of the sidewall 10c. The brake member 16 is formed of, for instance, an elastic material, and is provided so as to touch the periphery of the disk 3 when the disk 3 on the tray 2 is moved toward the ejection position.

The disk 3 rotating at a high speed for reproduction or recording on the tray 2 in the housing position touches the brake member 16 while moving in the X1 direction, so that the rotation of the disk 3 is stopped by the brake member 16. Therefore, when the disk 3 on the tray 2 is moved from the housing position to the ejection position, the rotation of the disk 3 is stopped without fail so as to prevent the disk 3 from being damaged.

The cover portion 10b having the above-described structure holds the portion of the disk 3, and the tray 2 is not attached to the cover portion 10b. Therefore, the cover portion 10b has a height (a dimension in a direction indicated by arrow Z1–Z2 in FIG. 3) lower than that of the housing portion 10a. Thereby, as shown in FIG. 3, a step is formed between the housing portion 10a and the cover portion 10b when viewing from the bottom surface of the disk unit 1.

This step produces a space for accommodating other devices of the notebook computer into which the disk unit 1 is incorporated. Therefore, by employing the disk unit 1 of this embodiment, the downsizing of a notebook computer can be realized.

Here, attention is directed to a bottom side position of the cover portion 10b in the direction into which the tray 2 is inserted (the X2 direction). An air current shaping (control)

member 20 is provided in the bottom side position of the cover portion 10b.

Figure 4:
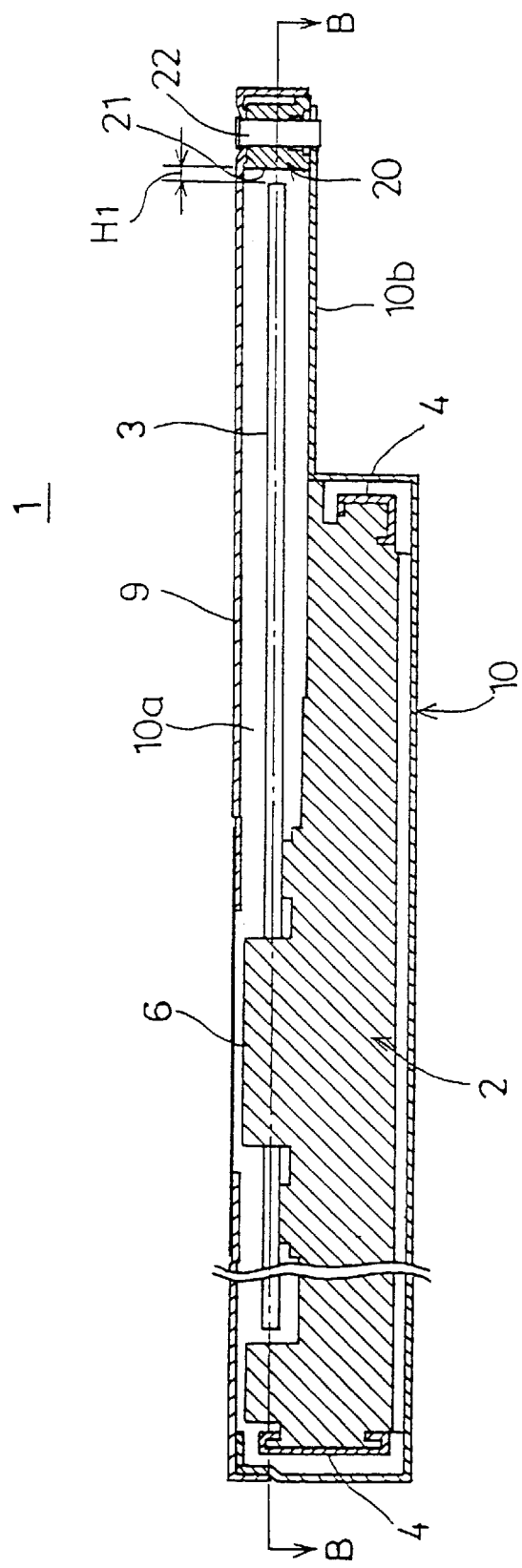
FIG. 4 is a sectional view of the disk unit of FIG. 2 taken along the line A—A.
Figure 5A:
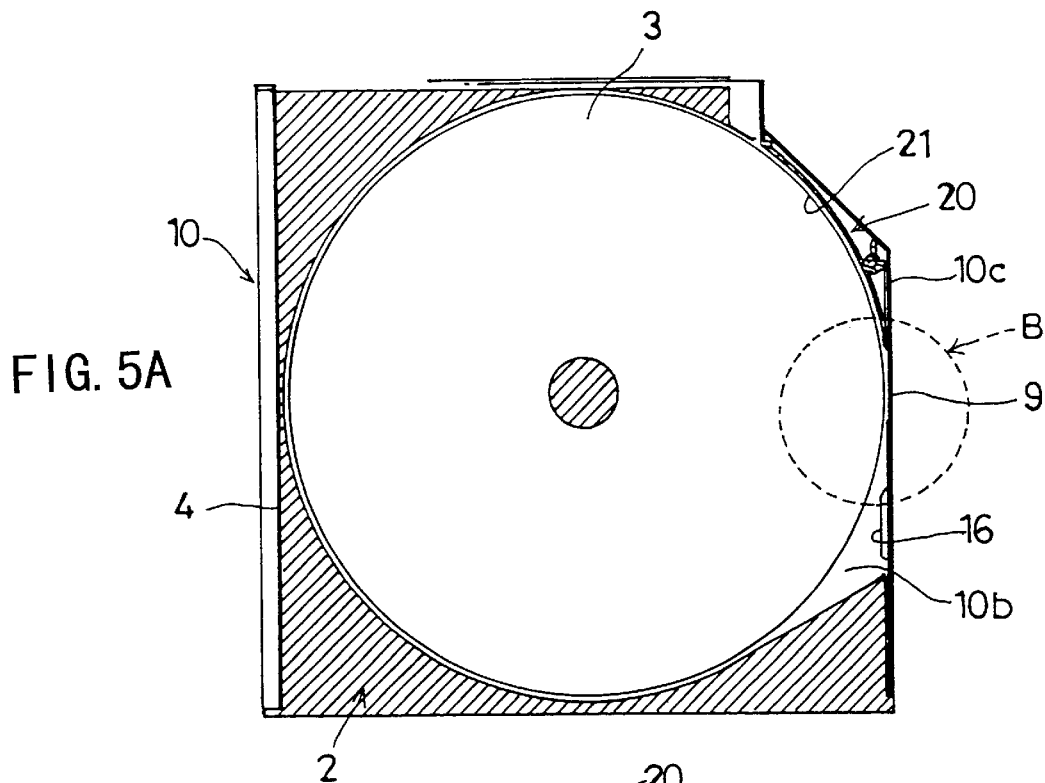
FIG. 5A is a sectional view of the disk unit of FIG. 2 taken along the line B—B.

The air current shaping member 20 is formed of a resin and is fixed to the cover portion 10b by fixing screws 22. Further, as shown in FIGS. 4 and 5A in addition to FIGS. 1 and 2, the air current shaping member 20 has a curved surface 21 opposing the peripheral edge of the disk 3 on the tray 2 in the housing position. The curved surface 21 is formed to have a curvature slightly larger than that of the periphery of the disk 3. Further, as shown enlarged in FIG. 5B, slopes 23 through 26 are formed on one end portion (the lower end portion in FIG. 5B) of the air current shaping member 20, one end portion (the lower end portion in FIG. 5B) of the second part of the sidewall 10c, one end portion (the upper end portion in FIG. 5B) of the first part of the sidewall 10c, and one end portion (the upper end portion in FIG. 5B) of the brake member 16, respectively.

Figure 5B:
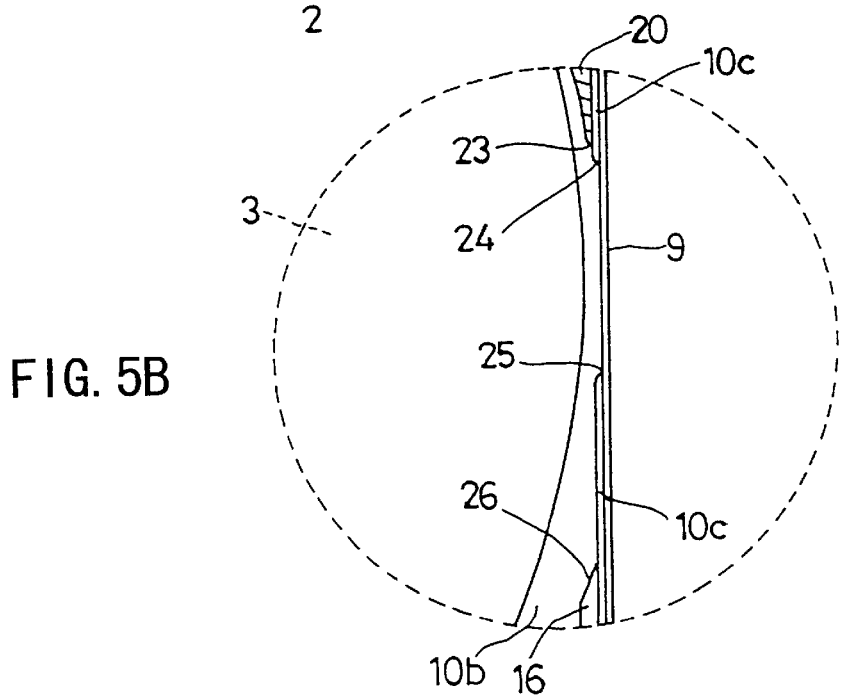
FIG. 5B is an enlarged view of a circled part indicated by arrow B in FIG. 5A.

According to this structure, the curved surface 21 of the air current shaping member 20 smoothly opposes, or is curved along, the peripheral edge of the disk 3 on the tray 2 moved to the housing position at a constant distance H1 (indicated by arrows in FIG. 4) from the peripheral edge of the disk 3. Further, the formation of the slopes 24 through 26 also causes the sidewall 10c and the brake member 16 to smoothly oppose the peripheral edge of the disk 3, respectively. FIG. 4 is a sectional view of the disk unit 1 of FIG. 2 taken along the line A—A. FIG. 5A is a sectional view of the disk unit 1 of FIG. 4 taken along the line B—B, and FIG. 5B is an enlarged view of a circled part indicated by arrow B in FIG. 5A.

By providing the air current shaping member 20 to smoothly oppose the peripheral edge of the disk 3 at the constant distance H1 therefrom and by providing the slopes 24 through 26 of the second and first parts of the sidewall 10c and the brake member 16 to smoothly oppose the peripheral edge of the disk 3 as in this embodiment, the amount of a change in an air current generated when the disk 3 is rotated at a high speed is reduced to prevent a noise from being generated in the disk unit 1. The reason for this will be described below.

The inventors of the present invention, in order to investigate the cause of a noise, examined whether a noise was generated in the above-described conventional disk unit including the disk tray having the disk placement portion (a circular concave portion with a bottom) in which a whole disk is positioned, with the result that no noise was generated in the conventional disk unit.

The noise is generated by the rotations of the disk in a position where a portion of the disk protruding from the disk tray opposes a cover portion. This is because the surface of the cover portion does not smoothly oppose, or is not curved along, the peripheral edge of the disk so that an air current suddenly changes in the position when the disk is rotated at a high speed.

Suppose that the air current shaping member 20 is not provided in the disk Emit 1, a substantially triangular space is formed, with the disk 3 being placed on the tray 2, among the peripheral edge of the disk 3, the sidewall 10c of the cover portion 10b, and the bottom side position of the cover portion 10b in which the air current shaping member 20 is to be provided. According to this structure, a distance between the peripheral edge of the disk 3 and the sidewall 10c of the cover portion 10b is not constant.

Therefore, if the disk 3 is rotated at a high speed without the air current shaping member 20, air currents generated by the rotations flow into the substantially triangular space, where a distance between the peripheral edge of the disk 3 and the side wall 10c of the cover portion 10b is not uniform. If the air currents thus flow into the space where the distance between the peripheral edge of the disk 3 and the side wall 10c of the cover portion 10b is not uniform, turbulence is caused in the air currents and results in generating a noise.

On the other hand, in the conventional disk unit including the disk tray having the disk placement portion for a whole disk, the disk is loaded by being positioned in the disk placement portion that is a circular concave portion with a bottom. Therefore, a distance between the inside wall of the disk placement portion and the peripheral edge of the disk is substantially constant, and it is concluded that this structure of the conventional disk unit prevents a noise generation.

Therefore, according to the present invention, the disk unit 1 of this embodiment includes the air current shaping member 20 in the bottom side position of the cover portion 10b in the direction into which the tray 2 is inserted, namely, in a position where a noise is generated. As described above, the air current shaping member 20 has the curved surface 21 formed to smoothly oppose the peripheral edge of the disk 3 on the tray 2 in the housing position at the constant distance H1 from the peripheral edge of the disk 3. Further, the slopes 23 through 26 are formed on the above-described end portions of the air current shaping member 20, the second and first parts of the sidewall 10c, and the brake member 16, respectively, so as to smoothly oppose the peripheral edge of the disk 3.

Therefore, even if the disk 3 is rotated at a high speed to generate the air currents, the flow of the air currents does not change greatly because the peripheral edge of the disk 3 and the air current shaping member 20 smoothly oppose at the constant distance H1 from each other. Therefore, a noise reduction can be realized. Thus, a noise generation can be reliably prevented even by the disk unit 1, which is downsized and has the tray 2 whose one side portion is cut off so that the disk 3 has the portion protruding therefrom.

Next, a description will be given, with reference to FIGS. 6 and 7, of the pickup assembly 7 provided on the tray 2.

Figure 6:
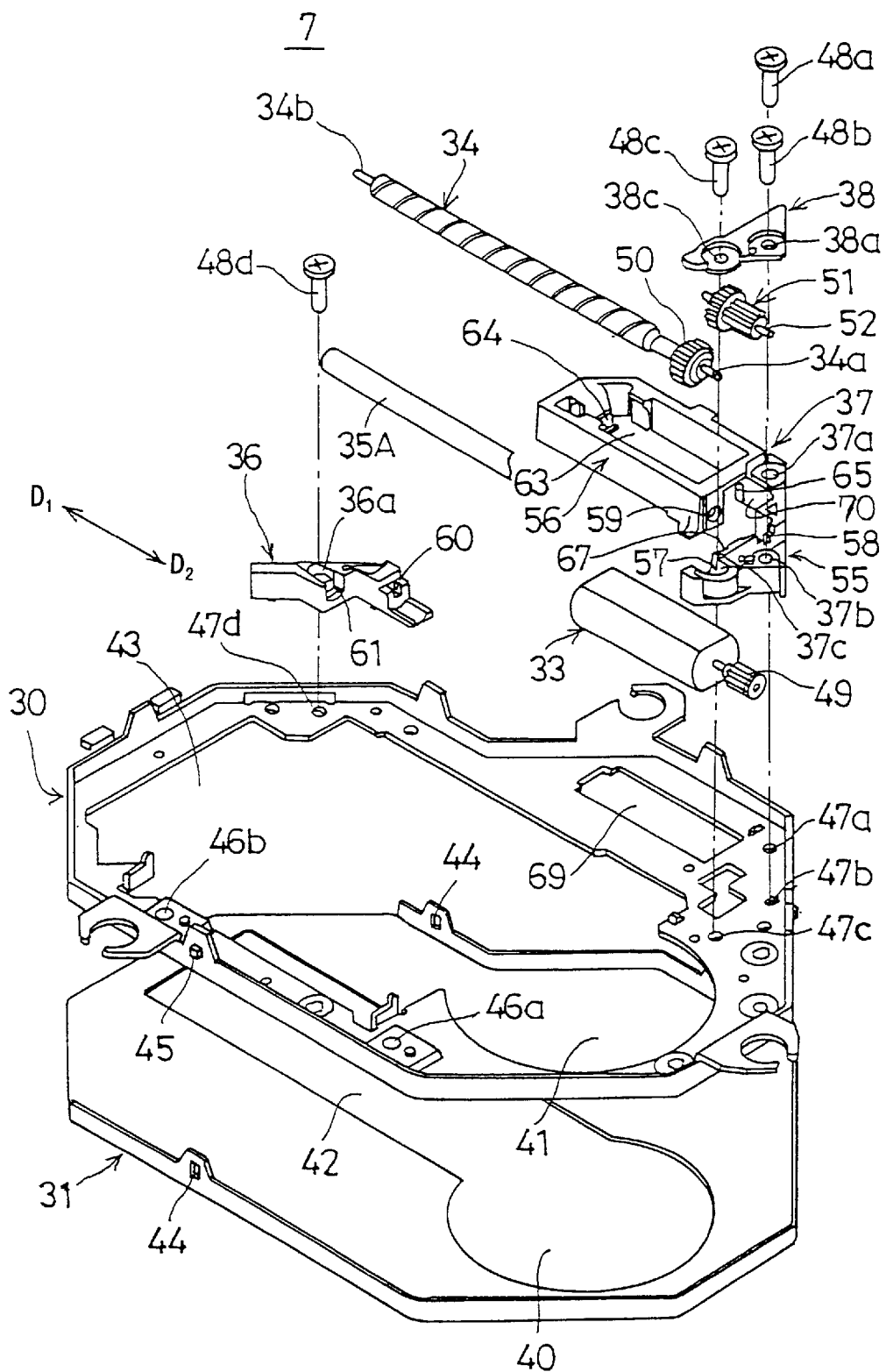
FIG. 6 is an exploded perspective bottom view of a pickup assembly provided in the disk unit.
Figure 7:
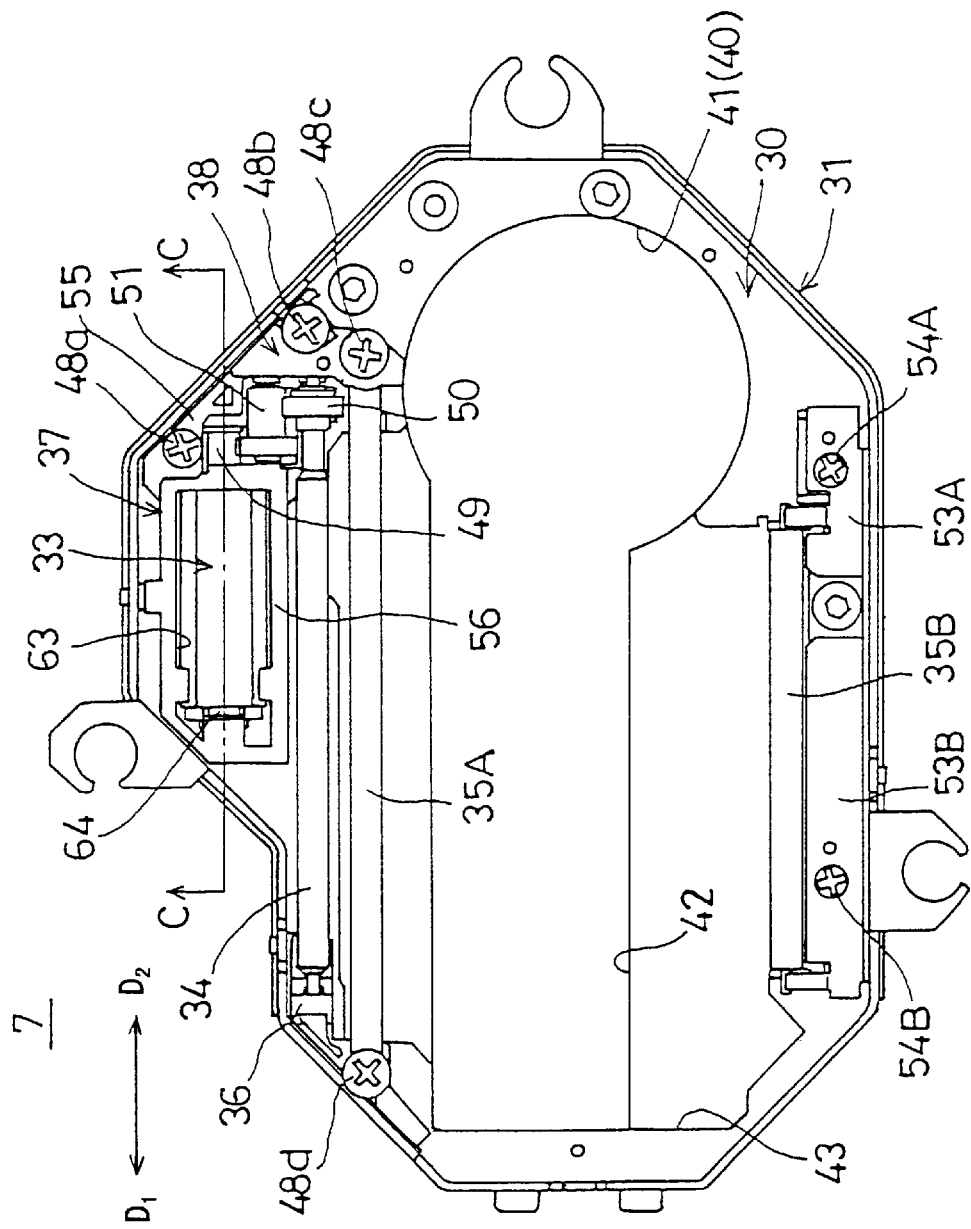
FIG. 7 is a bottom plan view of the pickup assembly.

FIGS. 6 and 7 are an exploded perspective bottom view and a bottom plan view of the pickup assembly 7, respectively.

As previously described, the pickup assembly 7 serves to move the optical pickup 5 in the radial direction of the disk 3 (in the direction indicated by the arrow D1–D2). As shown in FIGS. 6 and 7, the pickup assembly 7 includes a pickup base 30, a base cover 31, a thread motor 33, a lead screw 34, guide shafts 35A and 35B, a shaft holder 36, and a thread holder 37. For the convenience of graphical representation, the optical pickup 5 is not shown in FIGS. 6 and 7.

The pickup base 30 serves as a base plate to which the components of the pickup assembly 7 are attached. A turntable opening 41 into which the turntable 6 is inserted and a pickup opening 43 in which the optical pickup 5 is moved are connectedly formed in the pickup base 30 so that the pickup base 30 has a frame-like shape. Further, the pickup base 30 includes tapped holes 47a through 47d, 46a, and 46b to which later-described fixing screws 48a through 48d, 54A, and 54B are fixed.

The base cover 31 has its upper surface, which corresponds to the lower surface thereof in FIGS. 5 and 6, protruding from an opening 2b (shown in FIGS. 1 and 2) formed in the tray 2. The base cover 31 also has a turntable opening 40 into which the turntable 6 is inserted and a pickup opening 42 in which the optical pickup 5 is moved connectedly formed therein. The base cover 31 has an engaging hole 44 formed on each side thereof. The engaging holes 44 engage with hook portions 45 formed on the pickup base 30 so that the base cover 31 is fixed to the pickup base 30.

The lead screw 34 engages with a needle (not shown) formed on the optical pickup 5, and rotates to move the optical pickup 5 in the direction indicated by the arrow D1–D2. As will be described later, the lead screw 34 is rotationally driven by the thread motor 33.

The lead screw 34 has a driven gear 50 provided on one end portion 34a thereof in a D2 direction indicated by the arrow D1–D2. The D2 end portion 34a on which the driven gear 50 is provided is received by a later-described bearing portion 67 of the thread holder 37, and the other D1 end portion 34b of the lead screw 34 is received by a bearing portion 60 formed in the shaft holder 36.

The driven gear 50 is connected to a driving gear 49 provided to the driving shaft of the thread motor 33 via a later-described intermediate gear 51. Therefore, when the thread motor 33 is driven to rotate the driving gear 49, this rotational force is transmitted to the driven gear 50 via the intermediate gear 51 so that the lead screw 34 is rotated. Hence, by driving the thread motor 33, the optical pickup 5 is moved in the direction indicated by the arrow D1–D2.

The shaft holder 36 has a through hole 36a and a bearing portion 61 for receiving the guide shaft 35A formed therein in addition to the above-mentioned bearing portion 60. The fixing screw 48d penetrates through the through hole 36a to be fixed in the tapped hole 47d of the pickup base 30 so that the shaft holder 36 is fixed to the pickup base 30.

Each of the guide shafts 35A and 35B engages with a guide portion formed on each side of the optical pickup 5. The optical pickup 5 is guided by the guide shafts 35A and 35B to be moved.

As previously described, the guide shaft 35A is supported by the shaft holder 36 and the thread holder 37. On the other hand, the guide shaft 35B is supported by the pickup base 30 with fixing strips 53A and 53B being fixed to the pickup base 30 by the fixing screws 54A and 54B.

Next, a description will be given of the thread holder 37.

The thread holder 37 serves as a holding mechanism for holding, on the pickup base 30 (a base plate), the thread motor 33 (a drive means) generating a driving force to move the optical pickup 5. The thread holder 37 is made of a flexible resin and includes a fixed portion 55 and a flexible portion 56.

The fixed portion 55, which is fixed to the pickup base 30, has through holes 37a through 37c, bearing portions 57 and 58, and the above-described bearing portion 67 formed therein. The fixing screws 48a through 48c for fixing the fixed portion 55 to the pickup base 30 penetrate through the through holes 37a through 37c, respectively. As previously described, the bearing portion 57 receives a D2 end portion of the guide shaft 35A, and the bearing portion 67 receives the D2 end portion 34a of the lead screw 34.

Further, the bearing portion 58 cooperates with a bearing portion 59 formed in the flexible portion 56 to receive a shaft 52 of the intermediate gear 51. In this embodiment, the intermediate gear 51 is fastened integrally to the shaft 52 so as to rotate integrally therewith. Conventionally, the shaft of an intermediate gear is fixed so that the intermediate gear rotates on the shaft. According to this structure, the shaft and the intermediate gear have a wide contact area so as to have relatively large wear and generate a relatively loud noise therebetween, thus reducing reliability. However, this dis-advantage can be eliminated by integrating the intermediate gear 51 and the shaft 52 as previously described.

The fixed portion 55 having the above-described structure, with the bearing portions 57, 58, and 67 receiving the guide shaft 35A, the intermediate gear 51, and the lead screw 34, respectively, has its top covered with a thread cover 38 having through holes 38a and 38c formed therein. Then, the fixed portion 55 is fixed to the pickup base 30 by the fixing screws 48a through 48c. Specifically, the fixing screw 48a penetrates through the through hole 37a formed in the fixed portion 55 to be fixed in the tapped hole 47a of the pickup base 30. The fixing screws 48b and 48c penetrate through the through holes 38a and 38c formed in the thread cover 38 and the through holes 37b and 37c formed in the fixed portion 55 to be fixed in the tapped holes 47b and 47c of the pickup base 30, respectively. Thereby, the fixed portion 55 is fixed to the pickup base 30.

On the other hand, a motor housing portion 63 for housing the thread motor 33 is formed in the center part of the flexible portion 56 so that the flexible portion 56 has a frame-like shape in its plan view. Further, the bearing portion 59 for receiving a D1 end portion of the shaft 52 of the intermediate gear 51, and a U-shaped groove portion 65 for protruding the driving gear 49 provided to the thread motor 33 are formed on a side of the flexible portion 56, which side opposes the fixed portion 55.

Figure 8:
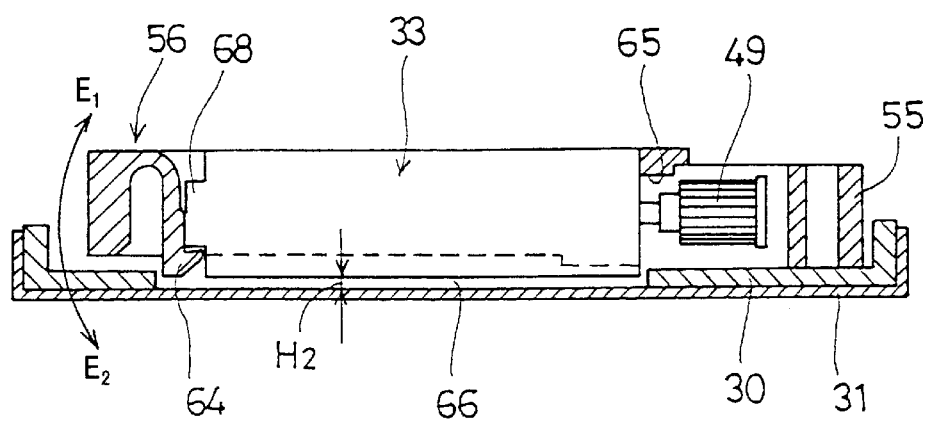
FIG. 8 is a sectional view of the pickup assembly of FIG. 7 taken along the line C—C.

A motor fixing hook 64 is formed integrally with the flexible portion 56 on its D1 end portion inside the motor housing portion 64 formed in the flexible portion 56. The motor fixing hook 64 engages with a convex portion 68 formed on the D1 end portion of the thread motor 33 with the thread motor 33 being housed in the motor housing portion 63. As shown in FIG. 8, the motor fixing hook 64 is substantially U-shaped, and deforms to some extent when the thread motor 33 is attached. The thread motor 33 is pressed in the D2 direction in FIG. 8 as a reacting force to the above-described deformation of the motor fixing hook 64. Accordingly, the thread motor 33 is fixed in the motor housing portion 63 without backlash by this pressing force.

The thread motor 33 generates vibrations when driven. Therefore, if the thread motor 33 is directly fixed to the pickup base 30, the vibrations generated by the thread motor 33 are immediately transmitted to the pickup base 30 to adversely affect the focusing or tracking of the optical pickup 5.

In order to cope with this problem, in this embodiment, the thread holder 37 is formed so that the flexible portion 56 is flexibly displaceable with respect to the fixed portion 55. Specifically, the flexible portion 56 is connected with the fixed portion 55 only by a connection portion 70 so as to form a cantilever-like shape with respect to the fixed portion 55.

As shown in FIGS. 6 and 8, with the thread holder 37 being provided, an opening portion 69 is formed in a position in the pickup base 30 which position opposes the flexible portion 56 so that a space 66 is produced between the flexible portion 56 and the base cover 31. The space 66 has a height H2 indicated by arrows in FIG. 8. By this structure, the flexible portion 56 is displaceable in a direction indicated by arrow E1–E2 in FIG. 8 with respect to the fixed portion 55.

With the thread holder 37 having the above-described structure, which allows the flexible portion 56 to be displaced in the direction indicated by the arrow E1–E2 with respect to the fixed portion 55, the vibrations generated by the thread motor 33 can be attenuated even if the thread motor 33 is driven to generate the vibrations. This prevents the vibrations of the thread motor 33 from being transmitted to the pickup base 30, and further prevents the vibrations from affecting other devices provided on the pickup base 30 including the optical pickup 5.

In this embodiment, the thread motor 33 that is a driving means has the driving gear 49 that is a driving force output portion positioned on the side of the fixed portion 55 in the flexible portion 56. Therefore, even if the flexible portion 55 is displaced by the vibrations of the thread motor 33, the rotations of the thread motor 33 can be securely transmitted to the intermediate gear 51.

That is, if the cantilever-like flexible portion 55 is displaced by the vibrations of the thread motor 33, the amount of displacement is large at a position distant from the fixed portion 55 or the connection portion 70, and is small at a position close thereto. Therefore, by providing the driving gear 49 to a position close to the fixed portion 55 in the thread motor 33, the displacement of the driving gear 49 can be limited to a small amount even if the thread motor 33 generates vibrations. This prevents the driving gear 49 from moving away from the intermediate gear 51, and allows the driving force of the thread motor 33 to be securely transmitted to the lead screw 34.

The present invention is not limited to the specifically disclosed embodiment, but variations and modifications may be made without departing from the scope of the present invention.

The present application is based on Japanese priority applications No. 2000-095366 filed on Mar. 30, 2000, and No. 2001-76453 filed on Mar. 16, 2001, the entire contents of which are hereby incorporated by reference.

What is claimed is:

1. A disk unit comprising:
    a tray having one side portion thereof cut off so that a disk placed on said tray has a portion protruding therefrom;
    a housing which said tray is inserted into or ejected from, the housing including a first portion for housing said tray and a second portion separated from said tray for covering the protruding portion of the disk; and
    an air current control member located in the second portion of said housing and having a curved surface; wherein:
    said curved surface of said air current control member lies in a position opposing a peripheral edge of the disk when inserted into said housing.

2. The disk unit as claimed in claim 1, wherein said curved surface opposes the peripheral edge of the disk at a constant distance therefrom.

3. The disk unit as claimed in claim 1, wherein said curved surface is curved along the peripheral edge of the disk.

4. The disk unit as claimed in claim 1, wherein said curved surface has a curvature slightly larger than that of the peripheral edge of the disk.

5. A disk unit comprising:
    a tray having one side portion thereof cut off so that a disk placed on said tray has a portion protruding therefrom;
    a housing which said tray is inserted into or ejected from, the housing including a first portion for housing said tray and a second portion separated from said tray for covering the protruding portion of the disk; and
    an air current control member provided in the second portion of said housing in a position opposing said disk when inserted into said housing for controlling a flow of air currents generated by rotations of the disk so as to prevent the flow of the air currents from changing greatly.

6. The disk unit as claimed in claim 5, wherein said air current control member comprises a curved surface.

7. The disk unit as claimed in claim 6, wherein said air current control member is provided in said second portion so as to have said curved surface opposing a peripheral edge of the disk moved into said housing.

8. The disk unit as claimed in claim 7, wherein said curved surface opposes the peripheral edge of the disk at a constant distance therefrom.

9. The disk unit as claimed in claim 7, wherein said curved surface is curved along the peripheral edge of the disk.

10. The disk unit as claimed in claim 9, wherein said curved surface has a curvature slightly larger than that of the peripheral edge of the disk.

11. The disk unit as claimed in claim 5, further comprising a cover, wherein the disk rotates in said housing substantially in a center position between a side of said cover and a side of said tray, the side of said cover opposing a first side of the disk and the side of said tray opposing a second side of the disk, the first and second sides of the disk opposing each other.

12. The disk unit as claimed in claim 11, further comprising a cover, wherein the disk rotates in said housing substantially in a center position between a side of said cover and a side of said tray, the side of said cover opposing a first side of the disk and the side of said tray opposing a second side of the disk, the first and second sides of the disk opposing each other.

* * * * *